United States Patent
Lewis et al.

(10) Patent No.: US 9,202,098 B2
(45) Date of Patent: Dec. 1, 2015

(54) SYSTEM FOR OPTICAL RECOGNITION, INTERPRETATION, AND DIGITIZATION OF HUMAN READABLE INSTRUMENTS, ANNUNCIATORS, AND CONTROLS

(75) Inventors: George Steven Lewis, Alvarado, TX (US); Carson Blaine Clanton, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 679 days.

(21) Appl. No.: 12/673,564

(22) PCT Filed: Aug. 15, 2008

(86) PCT No.: PCT/US2008/073327
§ 371 (c)(1),
(2), (4) Date: Feb. 15, 2010

(87) PCT Pub. No.: WO2009/026156
PCT Pub. Date: Feb. 26, 2009

(65) Prior Publication Data
US 2011/0149067 A1    Jun. 23, 2011

Related U.S. Application Data

(60) Provisional application No. 60/956,675, filed on Aug. 17, 2007.

(51) Int. Cl.
*H04N 7/18* (2006.01)
*H04W 4/00* (2009.01)
(Continued)

(52) U.S. Cl.
CPC *G06K 9/00* (2013.01); *B64D 45/00* (2013.01); *B64D 47/08* (2013.01); *G01D 3/08* (2013.01); *G01D 7/02* (2013.01); *G01P 1/08* (2013.01);
(Continued)

(58) Field of Classification Search
CPC ............ G01D 3/08; G01D 7/02; G06K 9/00; G06K 2209/03; G01P 1/08
USPC ...................................... 348/135; 375/240.08
See application file for complete search history.

(56) References Cited

U.S. PATENT DOCUMENTS 6,095,976 A * 8/2000 Nachtomy et al. ............ 600/443
7,171,036 B1 * 1/2007 Liu et al. ....................... 382/145
(Continued)

FOREIGN PATENT DOCUMENTS

WO    2006011141 A2    2/2006
WO    2006061820 A2    6/2006

OTHER PUBLICATIONS

First Office Action CN counterpart Application No. 200880112307.3, issued from the Chinese Patent Office received on Sep. 12, 2012.
(Continued)

*Primary Examiner* — Hee-Yong Kim
(74) *Attorney, Agent, or Firm* — James E. Walton

(57) ABSTRACT

A system for optically recognizing, interpreting, and digitizing human readable instruments, annunciators, and controls includes an image acquisition sensor operable to capture images of at least one of the instruments, annunciators, and controls; and a logic processing unit operable to decode the images captured by the image acquisition sensor and interpret the decoded images to determine a state of the at least one of the instruments, annunciators, and controls.

15 Claims, 12 Drawing Sheets

(51) Int. Cl.
    *G08B 21/00*     (2006.01)
    *G06K 9/00*     (2006.01)
    *G01D 3/08*     (2006.01)
    *G01D 7/02*     (2006.01)
    *G01P 1/08*     (2006.01)
    *B64D 45/00*     (2006.01)
    *B64D 47/08*     (2006.01)
    *G07C 5/08*     (2006.01)

(52) U.S. Cl.
    CPC .......... *G07C 5/0866* (2013.01); *G06K 2209/03* (2013.01)

(56) References Cited

U.S. PATENT DOCUMENTS

2004/0032906 A1* 2/2004 Lillig ...................... 375/240.08
2004/0091137 A1* 5/2004 Yoon et al. ................... 382/118
2004/0126014 A1* 7/2004 Lipton et al. ................. 382/173
2005/0151025 A1* 7/2005 Mendelson et al. .......... 244/195
2007/0171854 A1* 7/2007 Chen et al. .................... 370/328
2007/0236366 A1* 10/2007 Gur et al. ...................... 340/945
2008/0316010 A1* 12/2008 Chang .......................... 340/439

OTHER PUBLICATIONS

First Office Action CA counterpart Application No. 2,696,190 issued from the Canadian Intellectual Property Office issued on Jan. 23, 2013.
Third Office Action CN counterpart Application No. 200880112307.3 issued from the Chinese Patent Office.
Second Office Action CN counterpart Application No. 200880112307.3 issued from the Chinese Patent Office.
Office Action dated Jun. 16, 2014 from counterpart CN App. No. 200880112307.3.
Extended European Search Report issued by the European Patent Office in corresponding application No. 08827781.9-1907 dated Mar. 27, 2014.
Office Action dated Jan. 21, 2015 from counterpart EP App. No. 08827781.9.
Office Action dated Aug. 21, 2015 from counterpart EP App. No. 08827781.9.

* cited by examiner

SYSTEM FOR OPTICAL RECOGNITION, INTERPRETATION, AND DIGITIZATION OF HUMAN READABLE INSTRUMENTS, ANNUNCIATORS, AND CONTROLS

TECHNICAL FIELD

The present invention relates in general to optical recognition, interpretation, and digitization of human readable instruments, annunciators, and controls.

DESCRIPTION OF THE PRIOR ART

Instrumentation systems use electrical/electronic analog to digital systems to sense the physical state of specified electromechanical systems, digitize the sensor data, and store the digitized data for subsequent analysis. Such systems, however, are costly to produce, operate and maintain. Moreover, such systems undesirably increase the weight of weight-sensitive systems.

There are ways of sensing the physical state of electromechanical systems well known in the art; however, considerable shortcomings remain.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

Figure 1:
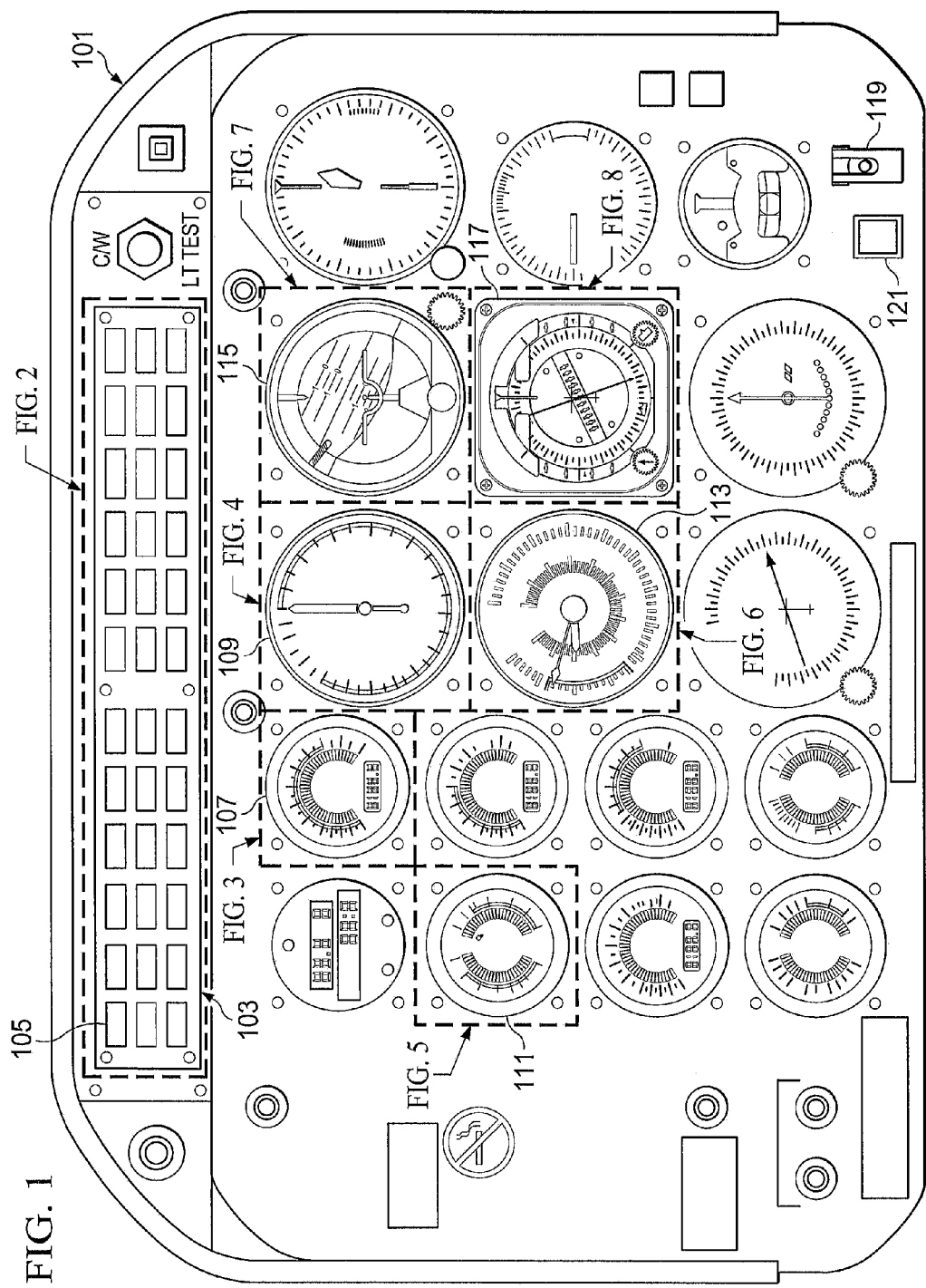
FIG. 1 is a view of an illustrative embodiment of a rotorcraft instrument panel.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present invention represents a system for optical recognition, interpretation, and digitization of human-readable instruments, annunciators, controls, and/or the like.

For the purposes of this disclosure, the term "instrument panel" means an apparatus including one or more instruments, annunciators, controls, and/or the like. Collectively, instruments, annunciators, controls and/or the like are "objects" of the instrument panel. Such objects, however, are not limited to instrument panel objects but include instruments, annunciators, controls, and/or the like of any suitable equipment. For example, an instrument may take on the form of a gauge having any suitable shape or size and having a mechanical indicator or needle that moves across the face of a fixed background to indicate the value of a parameter or condition under measurement. In another example, an instrument may include one or more selectively-illuminated segments that display the value of a parameter or condition under measurement. An exemplary annunciator may include one or more selectively-illuminated segments, such that the illumination status, e.g., on or off, bright or dim, color, etc., of one or more of the segments corresponds to the value of a parameter or condition under measurement. A control, for example, refers to any apparatus that may be used to alter the state of the control itself and/or another apparatus. Examples of such controls include, but are not limited to, switches, knobs, buttons, levers, pedals, wheels, actuators, or other such mechanisms that may be manipulated by either a human operator or another apparatus.

As used herein, the terms "camera" and "image acquisition sensor" refer to an apparatus that may be used to produce a digitized, computer-readable representation of a visual scene. Examples of such cameras or image acquisition sensors include, but are not limited to, digital cameras, optical scanners, radar systems, ultrasonic scanners, thermal scanners, electronic scanners, and profilometric devices.

For the purposes of this disclosure, the term "foreground" means image elements of interest during interpretation of a visual target. For example, a needle of a gauge may be considered as foreground in certain operations. As used herein, the term "background" means image elements that are of little or no interest during the interpretation of a visual target. For example, markings on a dial face of a gauge may be considered as background in certain operations.

It should be noted that the system and method of the present invention may be used in many diverse implementations, as is discussed in greater detail herein. The system is described in detail herein in relation to a rotorcraft instrument panel, although the scope of the present invention is not so limited. Rather, the system and method of the present invention may be used in relation to any human-readable instrument or instruments, irrespective of the type of equipment with which the instrument or instruments are associated.

Figure 2:
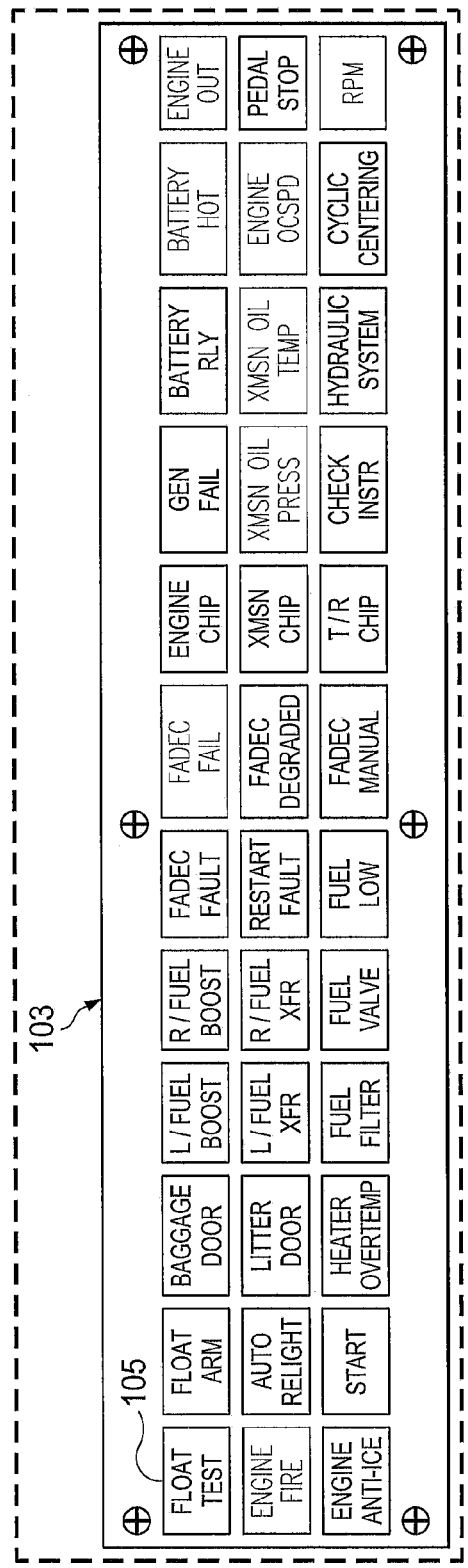
FIG. 2 is an enlarged view of an illustrative embodiment of an annunciator panel of the instrument panel of FIG. 1.

FIG. 1 depicts a rotorcraft instrument panel 101 including one or more instruments, annunciators, and the like, of various styles. In the illustrated embodiment, an annunciator panel 103, also shown in FIG. 2, includes one or more discrete annunciator segments, such as an annunciator segment 105, with each segment acting as an indicator for a specific, discrete condition. Examples of conditions indicated by such annunciator segments include, but are not limited to, engine fire, low fuel, battery hot, generator failure, and the like.

Figure 3:
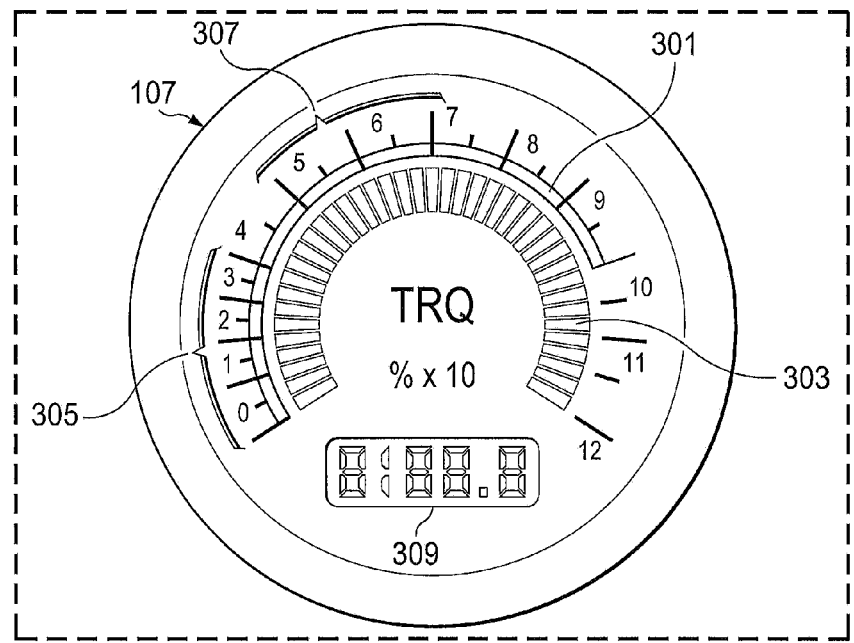
FIG. 3 is an enlarged view of an illustrative embodiment of a torque indicator of the instrument panel of FIG. 1.

As discussed above, rotorcraft instrument panel 101 includes one or more gauges, such as a gauge 107. Referring now to FIG. 3, gauge 107 includes a generally circular, graduated indicator or dial 301 on its face in the illustrated embodiment. The particular embodiment of gauge 107 illustrated in FIG. 3 employs segmented light-emitting diodes 303 that are illuminated to indicate the value of the parameter or condition being measured. Note that, in this case, the values on dial 301 are non-linear, i.e., a given angular displacement has different values depending upon which region of dial 303 the angular displacement is imposed. For example, the angular displacement in a region between values of 0 and 4, generally at 305, is about the same as the angular displacement in a region between values of 5 and 7, generally at 307. In other words, the gauge has about twice the resolution between values of 5 and 7 as the resolution between values of 0 and 4. The particular embodiment of gauge 107 provides an indication of engine torque. Gauge 107 further includes a five-character alphanumeric display 309 for displaying a numeric representation of a condition or parameter being measured or system status information during diagnostic procedures. In the illustrated embodiment, display 309 provides a numeric readout of engine torque or system status information during diagnostic procedures.

Figure 4:
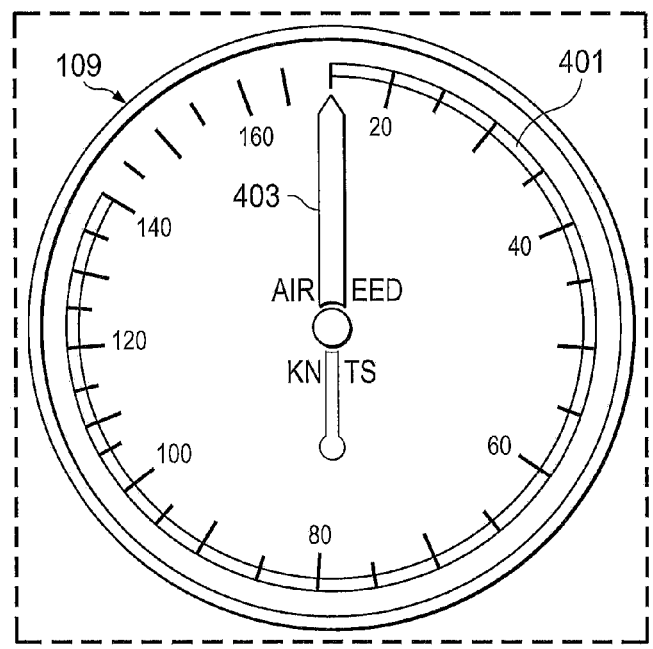
FIG. 4 is an enlarged view of an illustrative embodiment of an airspeed indicator of the instrument panel of FIG. 1.

Referring to FIGS. 1 and 4, the illustrated embodiment of rotorcraft instrument panel 101 further includes a gauge 109 having a circular, graduated indicator or dial 401 on its face. Gauge 109 employs a needle 403 to indicate a value of a condition or parameter being measured.

Figure 5:
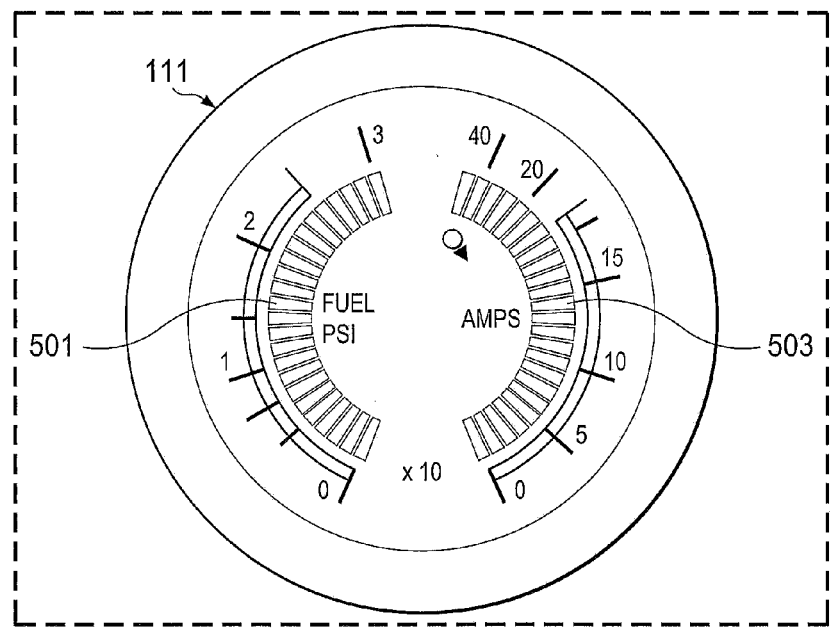
FIG. 5 is an enlarged view of an illustrative embodiment of an instrument of the instrument panel of FIG. 1 having two separate segmented light-emitting diode gauges.

Referring now to FIGS. 1 and 5, the illustrated embodiment of rotorcraft instrument panel 101 further includes an instrument 111 having two separate segmented light-emitting diode gauges 501 and 503. In the illustrated embodiment, gauge 501 indicates fuel pressure in pounds per square inch and gauge 503 indicates generator output in amperes.

Figure 6:
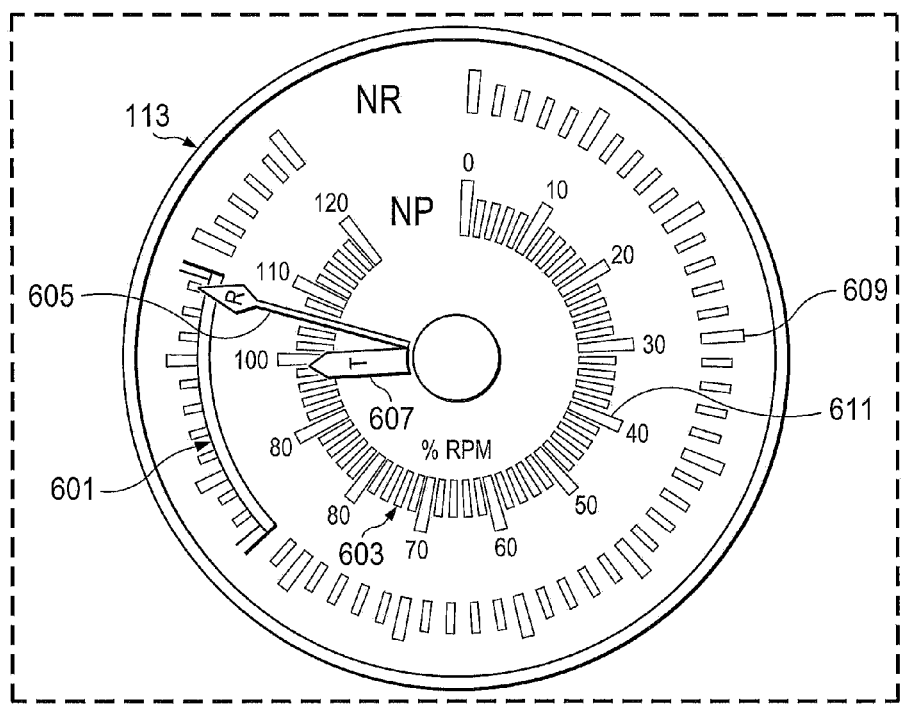
FIG. 6 is an enlarged view of an illustrative embodiment of an instrument of the instrument panel of FIG. 1 having two separate needle gauges.

Referring to FIGS. 1 and 6, the illustrated embodiment of rotorcraft instrument panel 101 further includes an instrument 113 having two separate needle gauges 601 and 603. Gauge 601 employs a needle 605 and gauge 603 includes a needle 607. Needles 605 and 607 move independently. In the illustrated embodiment, needle 605 indicates main rotor rotational speed as a percentage of normal rotor rotational speed for flight operations in relation to an outer scale 609. Needle 607 indicates engine turbine rotational speed as a percentage of normal engine turbine speed for flight operations in relation to an inner scale 611.

Figure 7:
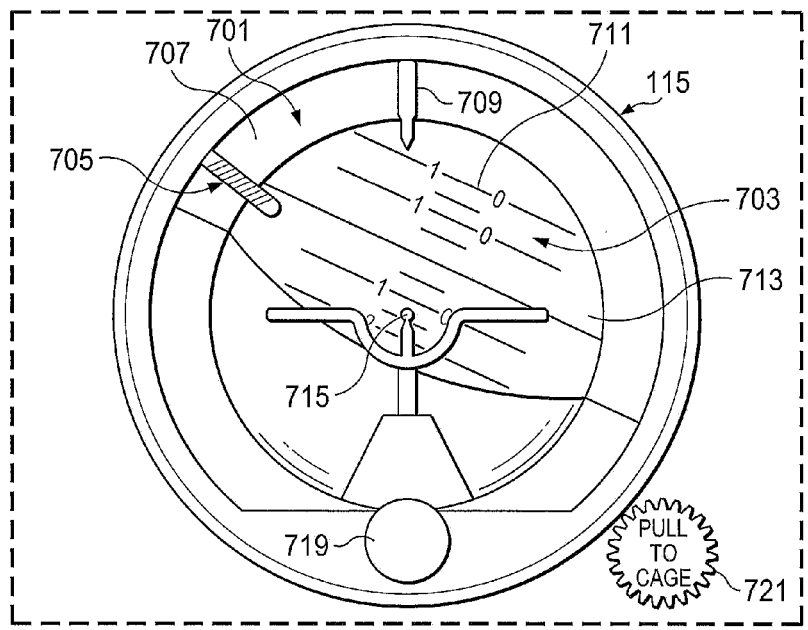
FIG. 7 is an enlarged view of an illustrative embodiment of an attitude indicator of the instrument panel of FIG. 1.

Referring now to FIGS. 1 and 7, the illustrated embodiment of rotorcraft instrument panel 101 further includes an instrument 115 that combines two graduated scale gauges 701 and 703 and a discrete annunciator 705 into one instrument. The particular instrument 115 depicted in FIGS. 1 and 7 is known as an "attitude indicator." In the illustrated embodiment, the bank angle or roll attitude of the rotorcraft is indicated using gauge 701 by motion of an outer dial 707 with respect to a fixed pointer 709. The measured value is read from a mark on outer dial 707 corresponding with pointer 709. The region in the center of instrument, i.e., gauge 703, uses a graduated scale 711 on a movable card 713 to indicate rotorcraft pitch attitude corresponding to a fixed pointer 715. Annunciator 705, known as a "barber pole," is a discrete annunciator indicating that instrument 115 is invalid or non-operational whenever annunciator 705 is visible to the human eye.

Still referring to FIG. 7, instrument 115 further includes a control in the form of a knob 719 that allows arbitrary setting of a zero pitch attitude reference. Instrument 115 also includes a control in the form of a knob 721 to cage gyroscopes operably associated with instrument 115.

Figure 8:
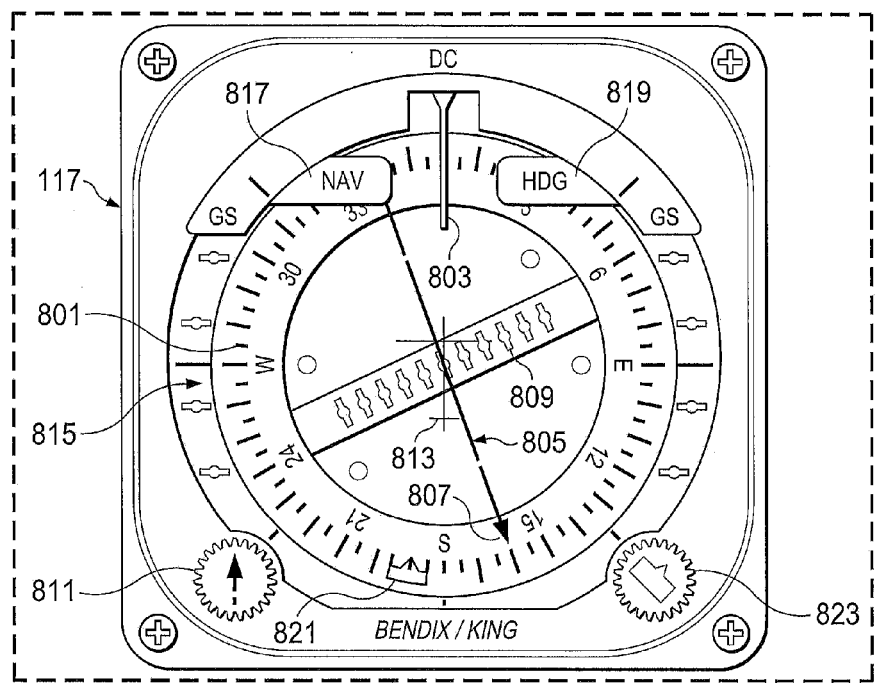
FIG. 8 is an enlarged view of an illustrative embodiment of a horizontal situation indicator of the instrument panel of FIG. 1.

Referring now to FIGS. 1 and 8, the illustrated embodiment of rotorcraft instrument panel 101 further includes an instrument 117 that combines a plurality of gauges, markers, scales, pointers, and the like, along with a plurality of discrete annunciators. In the illustrated embodiment, instrument 117 takes on the form of a horizontal situation indicator. The aircraft heading is displayed on a rotating azimuth or compass card 801 under a lubber line 803. A course deviation bar 805 operates with a fixed navigational reference receiver, such as a very high-frequency omni-directional range/localizer (VOR/LOC) navigation receiver, a very high-frequency omni-directional range tactical air navigation (VORTAC) receiver, or an instrument landing system (ILS) receiver to indicate either left or right deviations from the course that is selected with a course select pointer 807. Course deviation bar 805 moves left or right to indicate deviation from a center of scale 809. The desired course is selected by rotating course select pointer 807 with respect to compass card 801 by means of a course set knob 811. A fixed aircraft symbol 813 and course deviation bar 805 display the aircraft relative to the selected course as though the pilot was above the aircraft looking down. A glide slope deviation pointer, which is not shown in FIG. 8 as the pointer is only visible when a valid glide slope signal is being received, indicates the relationship of the aircraft to the glide slope. When the glide slope deviation pointer is above the center position of a scale 815, the aircraft is above the glide slope and an increased rate of descent is required.

Still referring to FIGS. 1 and 8, annunciator 817 indicates, when visible to the human eye, that the navigation functions of instrument 117 are inoperative. Annunciator 819 indicates, when visible to the human eye, that the heading functions of instrument 117 are inoperative. Annunciator 821 indicates a heading reference set by an operator of the rotorcraft using a control knob 823 of instrument 117.

Referring to FIG. 1, the illustrated embodiment of instrument panel 101 further includes a guarded toggle switch 119, which is a control to open or close a fuel valve of the rotorcraft. Instrument panel 101 further includes a push button switch 121 that is used to control an operational mode, i.e., automatic or manual, of a full authority digital engine control (FADEC). A face of button 121 illuminates as an annunciator of the currently selected FACEC mode.

FIG. 1 also shows numerous other instruments, annunciators, and controls present, visible to the human eye, and available to a crew during rotorcraft operations. From a single image represented in FIG. 1, the system described herein recognizes, interprets, and produces digital time histories for a plurality of annunciators, instruments, and controls using a single image acquisition sensor rather than sensors corresponding to each of the annunciators, instruments, and controls. In the implementation illustrated in FIG. 1, the system described herein recognizes, interprets, and produces digital time histories for 57 annunciators, 26 instruments, and seven controls using a single image acquisition sensor rather than 90 independent sensors required using conventional instrumentation. Accordingly, the cost, weight, and complexity of the system described herein are significantly less than for conventional sensing systems.

The examples described in the preceding paragraphs are characteristic of the types of a devices and apparatus to which the invention described herein can be applied; however, neither the listed items nor the helicopter context are in any way exhaustive as to the opportunities for application of this invention. For example, the present invention may be used with or incorporated into various types of equipment, systems, devices, and the like other than with or in rotorcraft.

Figure 9:
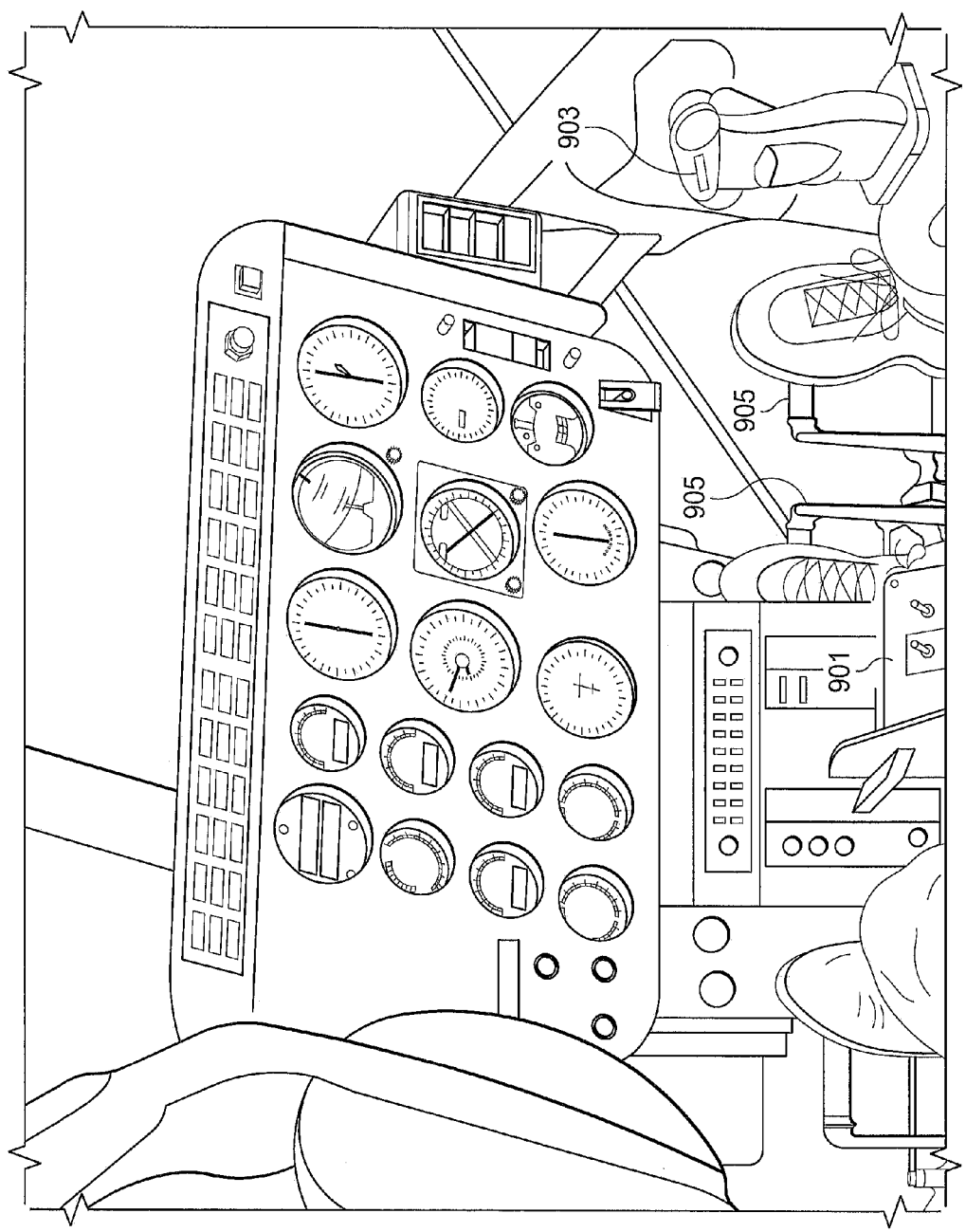
FIG. 9 is a perspective view of an illustrative embodiment of a rotorcraft instrument panel and cockpit.

FIG. 9 is a perspective view of a portion of a cockpit of a rotorcraft as captured by a digital cockpit video recorder (not shown in FIG. 9), i.e., an image acquisition sensor. Visible in FIG. 9 is a collective head 901 disposed at a free end of a collective lever (not shown in FIG. 9). Collective head 901 is used to control a thrust magnitude of a main rotor of the rotorcraft by varying an incidence angle of the main rotor blades of the rotorcraft. In practical use, raising collective head 901 generally increases thrust, while lowering collective head 901 generally decreases thrust. Also, visible in FIG. 9 is a cyclic grip 903. Movement of cyclic grip 903 causes cyclical pitch variations of the main rotor blades of the rotorcraft, resulting in redirection of main rotor thrust, to control direction of flight. Anti-torque or tail rotor pedals, indicated collectively as 905, are also visible in FIG. 9. Movement of pedals 905 causes a change in tail rotor thrust of the rotorcraft, resulting in a change in yaw attitude. Collective head 901, cyclic grip 903, and tail rotor pedals 905 are further examples of controls having positions that may be processed by the system described herein.

According to the system described herein, a digital representation of an image of the instruments, annunciators, and/or controls is interpreted using computerized means in a way corresponding to interpretation by human observation. In the case of annunciators, the state of the annunciator defines a quality or state being measured. Changes in chromaticity and/or intensity between annunciated states can be determined by the present system. In the case of various types of gauges, every possible discrete value for a gauge maps to a discrete position on a digitized image of that gauge. By using the present system to determine the position of the variable features of a gauge, e.g., a needle, the value indicated by the gauge at the time of image capture can be determined. Regarding a needle gauge, for example, if analysis of a digitized image determines that the needle is located at a position on a digitized image that maps to 100 knots of airspeed, the system can store 100 knots as the airspeed value at the time of image capture. Thus, the invention described herein can be used in place of more expensive, more complex, and bulkier conventional wired or even wireless instrumentation systems.

Figure 10:
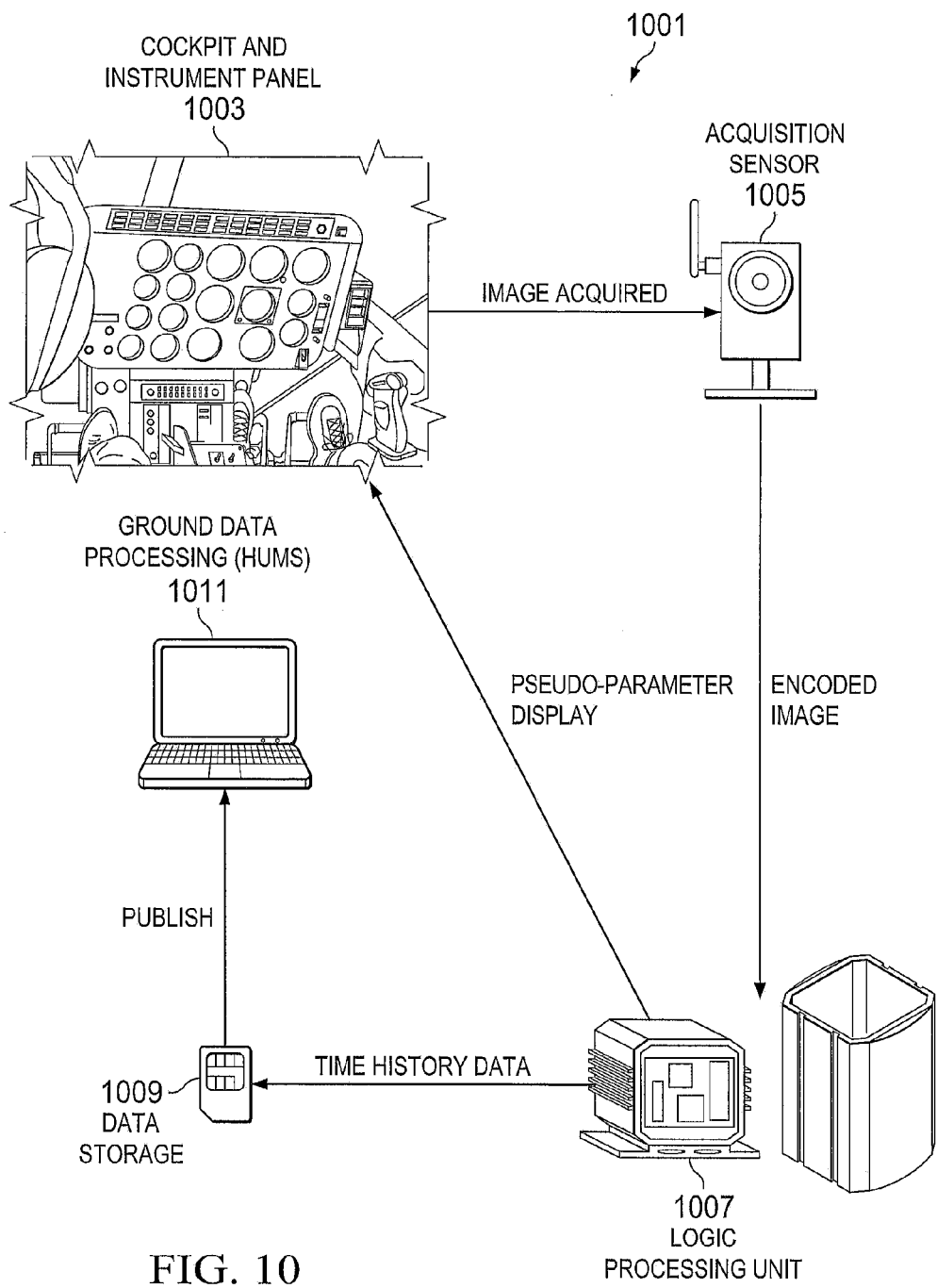
FIG. 10 is a graphical representation of an exemplary embodiment of a system for optical recognition, interpretation, and digitization of human readable instruments, annunciators, and/or controls.

FIG. 10 depicts an exemplary embodiment of a system 1001 for optical recognition, interpretation, and digitization of human-readable instruments, annunciators, and controls. The objects labeled as 1003 represent objects to be recognized, interpreted, and digitized. For example, in a rotorcraft implementation, objects 1003 represent objects in a rotorcraft cockpit, such as the instruments, annunciators, and controls described herein. System 1001 comprises an image acquisition sensor 1005, such as a digital camera that captures images of a rotorcraft instrument panel and the surrounding environment. In the illustrated embodiment, image acquisition sensor 1005 combines the image capture and encoding steps in one device, although the scope of the present invention is not so limited. Rather, in an alternative embodiment, image acquisition sensor 1005 captures the image and another device is used to encode the image into a digital representation. System 1001 further comprises a logic processing unit 1007, which, in the illustrated embodiment, is a digital computer executing software to decode and interpret the digitally-encoded image. Logic processing unit 1007 stores the states, preferably as time-based states, of one or more instruments, annunciators, and controls of interest represented in the image to a data storage device 1009. In some embodiments, logic processing unit 1007 creates pseudo-parameters to augment information available to the crew of the rotorcraft during flight. Pseudo-parameters are data items produced by combining two or more other parameters mathematically, lexically, and/or logically. For example, a vertical speed pseudo-parameter could be produced by taking the time derivative of altitude. Wind velocity, speed, and direction could be derived from satellite-based global positioning system data, airspeed, and heading. A downwind approach to land could be inferred from vertical speed, e.g., sink rate, low airspeed, and wind direction, while at low altitude. In some embodiments, system 1001 further includes a ground data processor 1011, e.g., a general-purpose computer using custom software. It should be noted that the components of system 1001 depicted in the drawings and/or the functions performed by the components may be combined, separated, and/or redistributed depending upon the particular implementation of system 1001.

Figure 11:
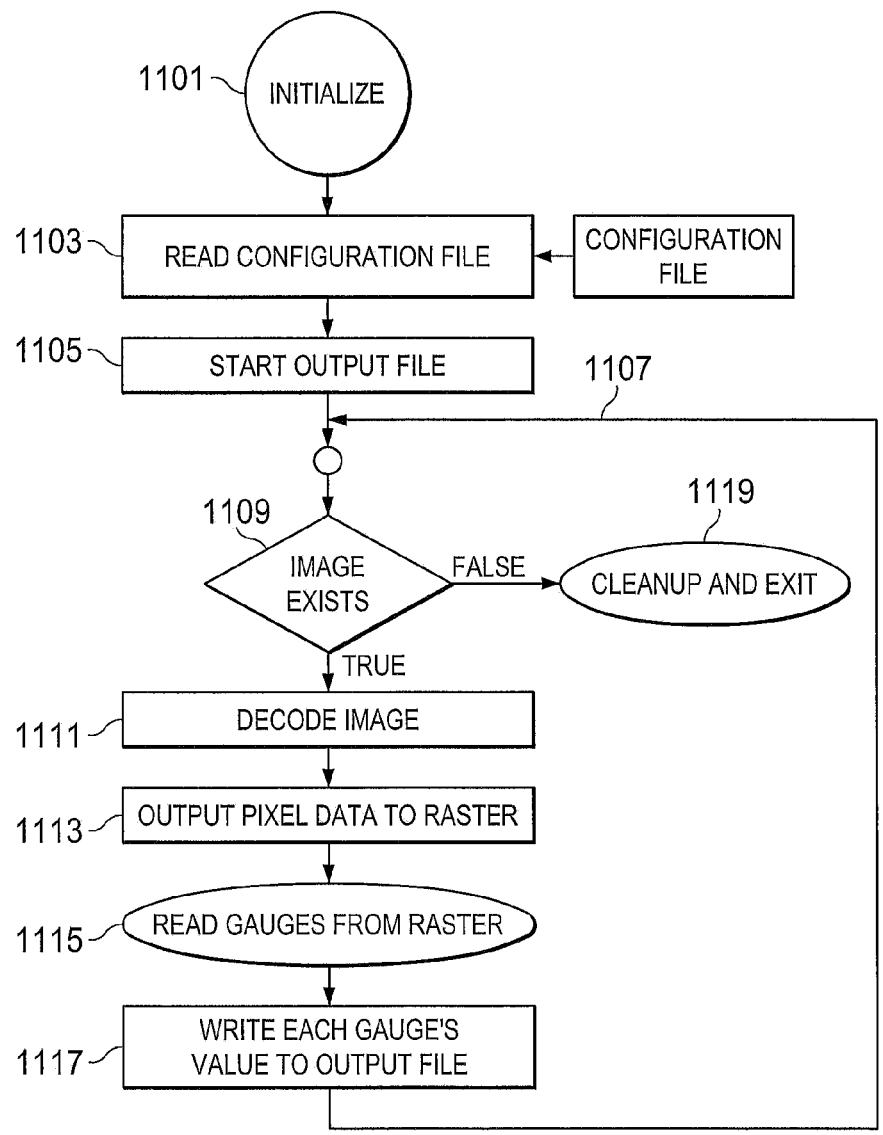
FIG. 11 is a block diagram of an illustrative process for controlling the overall optical recognition, interpretation, and digitization process of the system of FIG. 10.

FIG. 11 depicts a block diagram representing an illustrative embodiment of a method for optically recognizing, interpreting, and digitizing human-readable instruments, annunciators, and controls. In one implementation, the method is embodied in software encoded in media that can be read and executed by computing device. Upon initialization of the method (block 1101), a configuration file is read to provide a definition of the image to be interpreted (block 1103). The file contains information including, but not limited to the number, type, and location of all objects of interest, i.e., instruments, annunciators, and/or controls, to be interpreted; a definition of a scan region for each object; value maps associated with discrete locations within the scan region in the digitized image for use with threshold crossing techniques, as is described in greater detail herein; a mathematical representation of a reference region of the image for use in image registration; a mathematical representation of reference patterns used to determine states for objects interpreted using pattern matching techniques; chromaticity and intensity information for use in interpreting illumination status for lighted annunciators; chromaticity and intensity information for use in interpreting background versus foreground information; and/or other parameters needed by the method to ensure efficient operation, such as startup parameters, preferences, and the like.

It should be noted that the configuration file stores information for the processing of images to eliminate redundant processing. Human-readable instruments, annunciators, and control can be recognized without the configuration file and the scope of the present invention encompasses such an embodiment. In such an embodiment, the registration process is omitted. The embodiment is particularly useful in implementations wherein computer processing capacity is not an issue in the timely providing of real-time analysis.

In certain embodiments, system 1001 includes one or more computer programs encoded in media that can be read and executed by a computing system to facilitate the creation and maintenance of the configuration file using both automated and user-interactive methods. In such embodiments, previously defined objects can be automatically recognized using pattern matching techniques and manual techniques where an operator can define the configuration using custom tools in a graphical user interface (GUI).

Still referring to FIG. 11, the method assumes a piecewise continuous stream of images for analysis and opens an output file (block 1105), such as in data storage device 1009 of FIG. 10, to which a series of values as interpreted for each subsequent image can be written. The output file effectively contains a time history of all parameters interpreted and analyzed according to the definitions read from the configuration file.

The method enters a conditional loop 1107 and tests for the presence of a digital image representation to be interpreted (block 1109). If the image is present, the program decodes the image (block 1111) as necessary to create an indexable representation of the image. The decoding process may produce the indexable representation in any one or more possible forms according to the characteristics of the image being processed. In one embodiment, the image is a two-dimensional pixel bitmap or raster stored (block 1113) as two-dimensional array in computer memory. System 1001, however, is equally applicable to three-dimensional images. Gauges are then read from the raster (block 1115), as is discussed in greater detail with regard to FIG. 12. The value of each gauge is then written to the output file (block 1117). If the image is not present (block 1109), stored variables and the like are cleaned up and the method ends.

Figure 12:
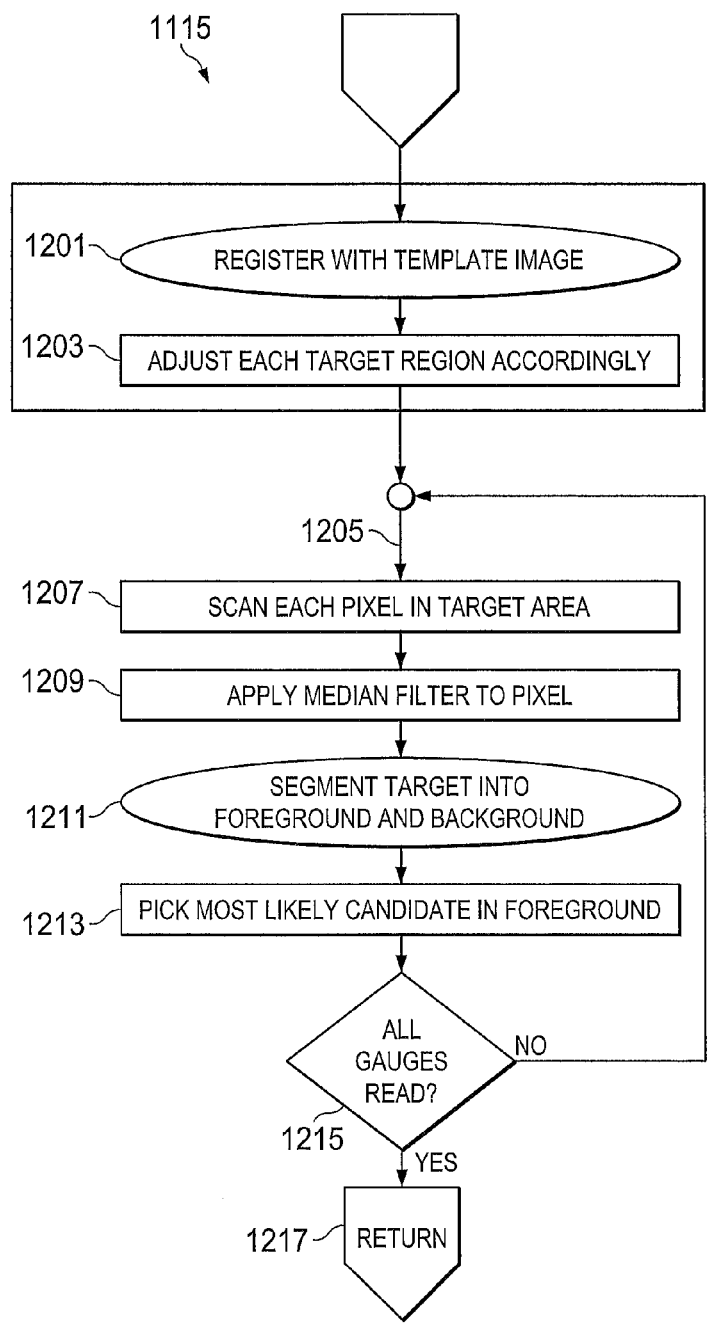
FIG. 12 is a block diagram depicting an illustrative process of determining a value of an instrument or indicator as it would be interpreted by a human operator.
Figure 13:
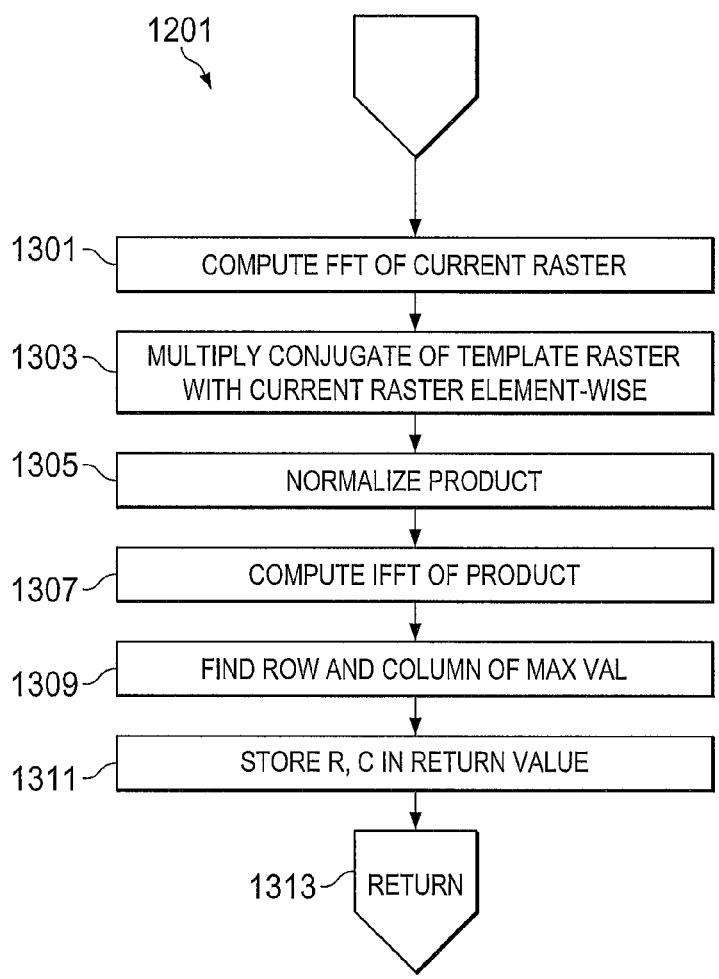
FIG. 13 is a block diagram depicting an illustrative image registration process whereby the actual position and orientation of an image relative to an expected position and orientation is calculated.

FIG. 12 depicts one particular embodiment of reading the gauges from the raster (block 1115) in FIG. 11. While the method depicted in FIG. 12 is described regarding two-dimensional techniques, the scope of the present invention is not so limited. The first step is to "register" the image (block 1201) to ensure proper alignment between the coordinate system of current raster and the coordinate system used in the creation of the configuration file. FIG. 13 shows that the first step in the registration process (block 1201) is to calculate a Fourier transform of the current rasterized image (block 1301). In this embodiment, fast Fourier transform (FFT) techniques are used. The reference region read from the configuration file is a conjugate of an FFT of a reference image. The next step is to element-wise multiply the reference FFT conjugate with the FFT of the current image (block 1303). The resulting product is then normalized element-wise such that all FFT values range between −1 and 1 (block 1305). The normalization process is not absolutely necessary but aids in overcoming errors due to image variations such as differences in lighting and/or optical noise. The next step is to compute the inverse FFT (IFFT) of the normalized product (block 1307). The final step is to find the row and column indices of the maximum value in the array from the IFFT (block 1309). The process is then repeated using polar coordinates to correct rotational differences. The resultant row and column indices are applied as offsets to row and column indices read from the configuration file (block 1311) and the process returns to the next step in FIG. 12 (block 1313).

It should be noted that the process of registration can be accomplished in other ways, which are encompassed within the scope of the present invention. For example, the region to be registered does not have to be a rectangular array. A single row of the raster can be used to obtain horizontal or lateral image shifts and a single column of the raster can be used to obtain vertical shifts. While the use of a single row and column of the raster may fail to determine the image shift when the shift involves both vertical and horizontal translation, the use of a single row and column of the raster may be sufficient or even desirable in certain implementations. Other ways of registering the image are contemplated by the present invention. Regarding embodiments of the present invention wherein registration is used, the manner in which registration is accomplished is immaterial to the practice of the invention.

The overall outcome of the registration process may be referred to as "image stabilization," inasmuch as image shifts due to changes in the relative position and orientation between the image acquisition sensor and the instrument panel in this case can be corrected for translational and/or rotational errors.

Referring back to FIG. 12, once registration is complete, the coordinates of each target region defined by the configuration file are adjusted by adding the row and column offsets from the registration process (block 1203). The next step is to enter a loop 1205 iterating through each threshold crossing type object defined in the configuration file. Once inside the loop, each pixel in the target region of the registered, current image is scanned (block 1207). A median filter is then applied to each pixel (1209). The value produced by the median filter is then assigned to the pixel. The median filter is used to reduce the effects of noise in the acquired image.

Figure 14:
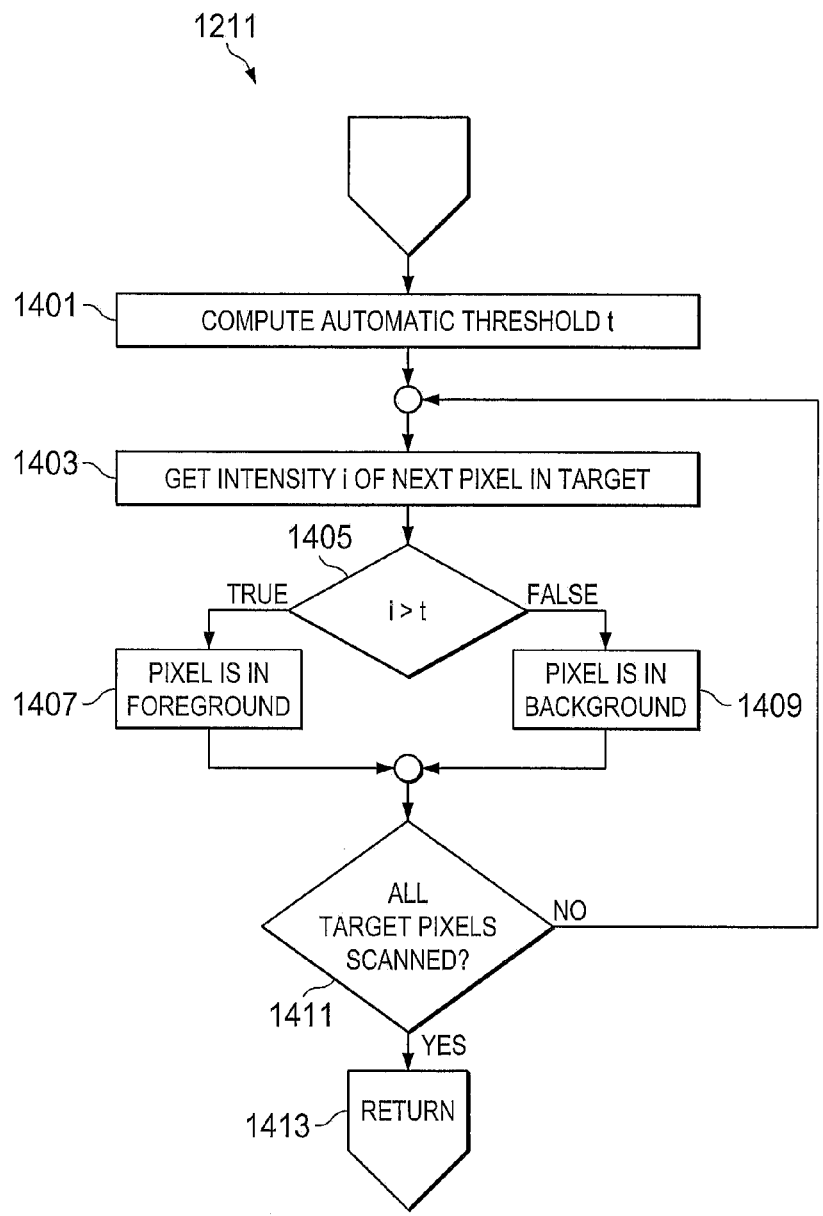
FIG. 14 is a block diagram of an illustrative target segmentation process which determines a state of an instrument by comparing optical properties of a target's foreground and background images.

FIG. 14 presents the process flow for segmenting the target region into foreground and background (block 1211 in FIG. 12). The first step is to compute a threshold value (block 1401) for the entire target region using the results of the median filter step. The present invention contemplates many ways for determining a threshold value, but a midpoint calculation between the minimum and maximum values for the target region has been tested and shown to be acceptable.

Threshold crossing detection is one method of normalizing the image to account for lighting variations. The present method is capable of operating under a variety of lighting conditions. In some cases objects are illuminated by ambient light from sun, moon, or area lighting. In some cases objects are illuminated by artificial backlighting or directed face lights. The color and intensity will vary widely. For example, night flying generally uses low intensity red artificial lighting. Other techniques including but not limited to grayscale analysis and/or negative image analysis are also options for handling variation in chromaticity and/or intensity of light.

Once the threshold value has been established, the intensity of each pixel in the target is retrieved (block 1403) and the intensity of each pixel is compared to the threshold (block 1405) and classified as either foreground (block 1407) or background (block 1409). Once all pixels have been scanned (block 1411), the process returns (block 1413) to the next step in FIG. 12.

Referring back to FIG. 12, the next step is to pick the most likely candidate from among the foreground pixels which correspond to the location of the instrument's variable feature (block 1213). The methods for determining the most likely candidate can be as varied as the types of objects being interpreted. For example, a needle position might be determined by calculating the centroid of a cluster of foreground pixels. A segmented LED gauge value might be interpreted by determining the location at which there is an abrupt and non-reversing change from foreground to background pixels in the target region. An annunciator state might by interpreted by detecting the presence of one or more foreground pixels in the target region, with the number dependent upon such factors as quality of the image, desired confidence level, or other measures.

Figure 15:
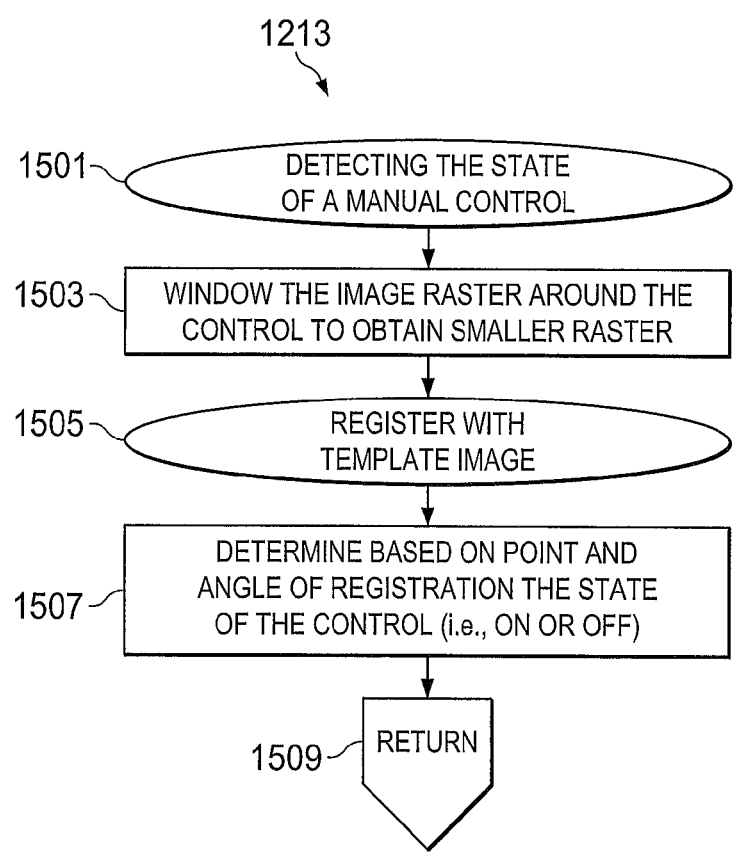
FIG. 15 is a block diagram of an illustrative pattern matching technique used for determining control states or instrument readings.

FIG. 15 refers to image interpretations using pattern matching techniques, which is one embodiment of block 1213 in FIG. 12. The techniques described herein are essentially a repeat of the image registration process using a stored mathematical representation of a reference pattern to determine the state of an object (block 1501). The image raster is windowed around the control to obtain a smaller raster (block 1503) and the registration process is conducted over the smaller region of the image (block 1505). The phase correlation result is statistically analyzed to determine the probability of match of the reference pattern (block 1507) and the process returns (block 1509) to the next step in FIG. 12. Numerous other pattern matching variations well known in the literature could likewise be employed. Pattern matching techniques might be a preferred method for determining states of particular knobs, switches, and/or levers not well suited for threshold crossing techniques.

Threshold crossing and pattern matching techniques can also be used, either singly or in combination, to interpret the position of primary flight controls such as the collective to which collective head 901 is attached, cyclic grip 903, or tail rotor pedals 905, all shown in FIG. 9.

Referring again to FIG. 12, once the values and/or states of all instruments, annunciators, and/or controls have been interpreted for the current image (block 1215), the values are stored in an output file (block 1117 of FIG. 11), preferably stored on removable media. Both crashworthy and non-crashworthy removable media implementations are contemplated by the present invention. The entire process is then repeated for the next image.

Various methods for data quality evaluations are possible using this invention. Threshold crossing detection is an effective method for detecting when an object is occluded from the camera view, such as by a pilot's arm as he reaches in front of the instrument panel to press a button or turn a knob. The minimum, maximum, and threshold values calculated from a median filtered image of a bare arm or a shirt sleeve will be very close, allowing the system to interpret that the target region is occluded. Redundant measurements are also used assess the quality of the interpreted value. For example, the roll angle from the attitude indicator 115 (shown in FIGS. 1 and 7) can be interpreted from target regions scanned on both the left and right sides of the rotating outer dial 707. In addition to multiple target regions, multi-directional scans provide redundancy. For example scanning left-to-right followed by a right to left scan may detect blurriness or multiple threshold crossings in which case the image may be "deblurred" using Fourier optics techniques. If multiple threshold crossings are detected, various expert and/or statistical wild point editing techniques may be employed. Interpretations made using pattern matching techniques can check for multiple states, up/down, on/off, etc. Data from one source can also be compared and correlated with data from other sources, including other optically interpreted sources to assess data quality. Suspect data can be tagged by such means as sentinel values or data quality bits.

In some cases, data interpreted from one source may be used in conjunction with data from other sources (optical or otherwise) for various purposes. One such case would be estimating wind velocity and direction using optically interpreted airspeed and heading data in conjunction with ground speed and ground track data from a wired Global Positioning System (GPS) sensor. Wind speed information thus derived could be stored as a time history "pseudo-item" as well as displayed to the pilot real-time in flight.

The present invention provides significant advantages, including: (1) providing a cost-effective means for monitoring human-readable instruments, annunciators, and controls in an aircraft, such as a rotorcraft; (2) providing a cost-effective means for monitoring human-readable instruments, annunciators, and controls associated with any type of equipment or machinery, such as industrial processing machinery, material handling equipment, machine tools, or the like; (3) providing a lower complexity means for monitoring the state of aircraft systems, equipment, machinery, or the like; and (4) providing a lower weight means for monitoring the state of aircraft systems, equipment, machinery, or the like.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below. It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A system for optically recognizing, interpreting, and digitizing human readable instruments, annunciators, and controls, comprising:
   an image acquisition sensor operable to capture images of multiple instruments, annunciators, and controls; and
   a logic processing unit operable to decode the images captured by the image acquisition sensor and interpret the decoded images to determine a state of the multiple instruments, annunciators, and controls;
   wherein the human readable instruments, annunciators, and controls are objects in an aircraft cockpit;

wherein the system detects when at least one of the objects is occluded from the images captured by the image acquisition sensor;

wherein the system groups the objects into an occluded group of objects and a non-occluded group of objects; and wherein the system continues to determine the state of the non-occluded group of objects while the at least one of the multiple instruments, annunciators, and controls is occluded.

2. The system of claim 1, wherein the logic processing unit is operable to store the state of at least one of the multiple instruments, annunciators, and controls.

3. The system of claim 1, wherein the logic processing unit is operable to store time-based states of at least one of the multiple instruments, annunciators, and controls.

4. The system of claim 1, wherein the logic processing unit creates a pseudo-parameter from the state of at least one of the multiple instruments, annunciators, and controls.

5. The system of claim 1, further comprising:
a ground data processor operably associated with the logic processing unit.

6. The system of claim 1, wherein the aircraft is a rotorcraft.

7. A method for optically recognizing, interpreting, and digitizing human readable instruments, annunciators, and controls, comprising:
reading a configuration file to provide a definition of a target region of an image to be interpreted of at least one of the instruments, annunciators, and controls to be interpreted;
opening an output file for storing the image to be interpreted;
determining whether a captured image to be interpreted exists;
if the captured image exists:
decoding the captured image;
determining a state of the at least one of the instruments, annunciators, and controls based upon the decoded captured image and the definition in the configuration file;
detecting when the at least one of the instruments, annunciators, and controls are not occluded from the captured image;
ignoring the state of the at least one of the instruments, annunciators, and controls that are occluded; and
writing the state of the at least one of the non-occluded instruments, annunciators, and controls to the output file.

8. The method of claim 7, wherein the configuration file includes one or more of:
a number of the at least one of the instruments, annunciators, and controls to be interpreted;
types of the at least one of the instruments, annunciators, and controls to be interpreted;
locations of the at least one of the instruments, annunciators, and controls to be interpreted;
a definition of a scan region of the at least one of the instruments, annunciators, and controls to be interpreted;
value maps associated with the locations of the at least one of the instruments, annunciators, and controls to be interpreted;
a mathematical representation of a reference region of the image for use in image registration;
a mathematical representation of reference patterns used to determine states of the at least one of the instruments, annunciators, and controls to be interpreted;
chromacity and intensity information for use in interpreting illumination status for an annunciator;
chromacity and intensity information for use in interpreting background versus foreground information of the image; and
startup parameters and preferences.

9. The method of claim 7, wherein the output file includes a time history of parameters interpreted and analyzed based upon definitions read from the configuration file.

10. The method of claim 7, wherein decoding the image results in a two-dimensional pixel bitmap or raster stored as a two-dimensional array.

11. The method of claim 7, wherein determining the state of the at least one of the instruments, annunciators, and controls is accomplished by:
registering the captured image with the definition of the target region of the image to be interpreted;
adjusting coordinates of the target region defined by the configuration file based upon registering the captured image;
scanning each pixel of the registered, captured image;
applying a median filter to each pixel of the registered, captured image;
segmenting the target region into foreground and background; and
picking foreground pixels corresponding to a variable feature of the at least one of the instruments, annunciators, and controls to be interpreted.

12. The method of claim 11, wherein registering the captured image is accomplished by:
computing a Fourier transform of the captured image;
element-wise multiplying a reference Fourier transform conjugate from the configuration file with the Fourier transform of the captured image;
computing an inverse Fourier transform of the multiplied reference Fourier transform conjugate and the Fourier transform of the captured image;
finding row and column indices of a maximum value in an array resulting from the inverse Fourier transform; and
storing the row and column indices.

13. The method of claim 12, further comprising:
element-wise normalizing the multiplied reference Fourier transform conjugate and the Fourier transform of the captured image prior to computing the inverse Fourier transform.

14. The method of claim 11, wherein segmenting the target region into foreground and background is accomplished by:
computing a threshold value for the target region based upon results of applying the median filter to each pixel of the registered, captured image;
retrieving an intensity of each pixel in the target area of the captured image;
comparing the intensity of each pixel to the threshold value; and
classifying each pixel as foreground or background.

15. The method of claim 11, wherein picking foreground pixels corresponding to a variable feature of the at least one of the instruments, annunciators, and controls to be interpreted is accomplished by:
windowing the captured image around the target area;
registering the windowed area of the captured image with the definition of the target region of the image to be interpreted; and
determining the state of the at least one of the instruments, annunciators, and controls to be interpreted based on the result of registering the windowed area.

* * * * *